P. P. MAST.
Feeding-Mechanisms for Grain-Drills.
No. 157,478. Patented Dec. 8, 1874.
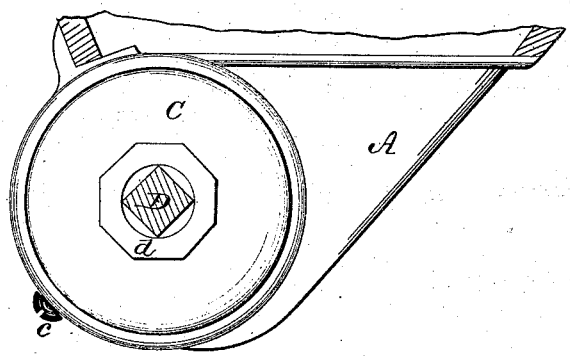
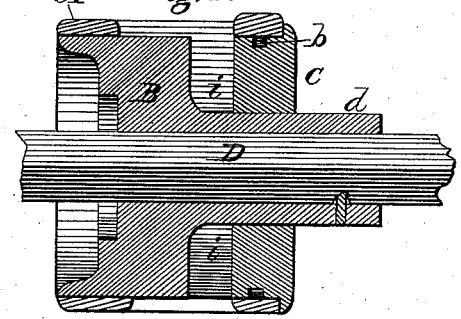
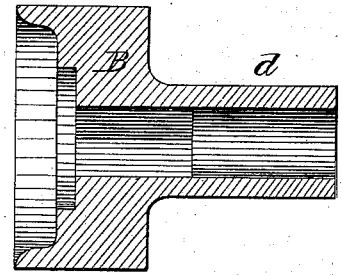
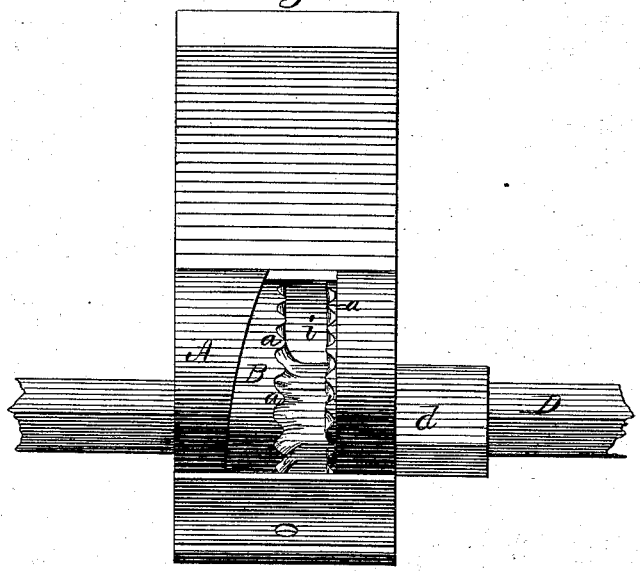
Witnesses:
H. H. Dodge
Wm. E. Chaffee
Inventor:
Phineas P. Mast
By his Attys.
Dodge & Son

UNITED STATES PATENT OFFICE.

PHINEAS P. MAST, OF SPRINGFIELD, OHIO, ASSIGNOR TO P. P. MAST & CO., OF SAME PLACE.

IMPROVEMENT IN FEEDING MECHANISMS FOR GRAIN-DRILLS.

Specification forming part of Letters Patent No. 157,478, dated December 8, 1874; application filed May 19, 1874.

*To all whom it may concern:*

Be it known that I, P. P. MAST, of Springfield, in the county of Clarke and State of Ohio, have invented certain Improvements in Feeding Mechanism for Grain-Drills, of which the following is a specification:

This invention consists in combining, in a cup or case, two vertical feed wheels or disks side by side, arranged so that the space between them may be varied and the rate of feed thereby increased or diminished without changing the speed of the wheels.

Figure 1 is a side elevation of the device; Fig. 2, a longitudinal vertical section through the center of the same; Fig. 3, a longitudinal central section through one of the wheels; and Fig. 4, a top plan view of the entire device.

The invention relates to that class of force-feeds in which the grain is fed from a case or cup, by and between the sides of two wheels or disks arranged vertically within the case.

The object of the invention is mainly to construct the devices so that the rate of feed may be changed, as desired, without changing the speed of the feed-wheels, in order that the complicated and expensive gearing now generally employed may be dispensed with.

This end I accomplish by simply making the two wheels or disks adjustable in relation to each other, so that the space or distance between them may be increased or diminished at will to any required extent.

In the drawings, A represents the feed cup or case; B and C, the two feed wheels or disks mounted therein; and D, the driving-shaft, passing centrally through the wheels and case. Both wheels or disks have their inner opposing sides or faces provided with radial teeth or corrugations *a*. Their outside edges or peripheries are made smooth, and are closely encircled by the case or cup. The wheel C is provided with a peripheral groove, *b*, into which fixed studs or screws *c* project, so as to hold the wheel from moving laterally, but permit it to rotate freely in the case. The wheel B is also left free to turn in the case, and is provided, on its inner side, with a central hub or boss, *d*, which is made of a polygonal form and extended through the wheel C, so as to rotate the latter with wheel B. The wheel B is also provided with a central hole or eye to receive the driving-shaft D, which is made of a square or other polygonal form, so as to turn the wheels. The wheel B is, however, left free to slide with the driving-shaft, on which it is secured and within the case or cup, so that the space *i* between it and the wheel C may be increased or diminished to any desired extent.

The cup is so constructed that, receiving the grain at the top from the hopper of the machine, it guides the same down in front of and between the two wheels, the inner toothed faces or sides and the hub of which carry the grain down and discharge it through the opening made for the purpose in the bottom of the cup.

Changing the distance between the two wheels changes the size of the grain passage or outlet, and consequently increases or diminishes the rate of feed, as the case may be, the speed of the wheels remaining unchanged.

By increasing the distance between the wheels the machine may also be adapted for feeding oats.

If desired the hub of wheel B may be omitted, as the surface of the polygonal shaft will then serve as a carrying or feeding surface to urge the grain forward.

The teeth or corrugations on the faces of the wheels may be omitted, the wheels changed in form and size, as desired, both wheels made adjustable, the cup changed in form, and any suitable mechanism used for giving the adjustment.

The essential feature is changing the distance between the adjoining side faces of the wheels when said faces do the feeding or the main part thereof.

It is preferable to secure the wheel B to the shaft and to adjust them by moving the latter, but they may be moved on the shaft.

Having described my invention, what I claim is—

1. A force-feed for grain-drills, consisting of two vertically-rotating wheels or disks with a space between them, through which the grain is fed, said wheels or disks being arranged substantially as described, whereby the distance or space between them may be increased or diminished at will to vary the rate of feed without changing the speed of the wheels, as set forth.

2. The combination of a cup or case, A, with two vertically-rotating wheels or disks mounted side by side therein, substantially as described, so that the distance between said wheels or disks may be varied at will to vary the rate of feed.

3. In combination with the cup A, the two vertically-rotating feed wheels or disks B and C, one of said feed-wheels being adjustable laterally, while the other is prevented from moving laterally, substantially as described.

PHINEAS P. MAST.

Witnesses:
   P. T. DODGE,
   T. C. SMITH.